United States Patent [19]

Phillips et al.

[11] Patent Number: 5,745,780
[45] Date of Patent: Apr. 28, 1998

[54] METHOD AND APPARATUS FOR SOURCE LOOKUP WITHIN A CENTRAL PROCESSING UNIT

[75] Inventors: James Edward Phillips, Round Rock; George Quyen Phan, Austin, both of Tex.

[73] Assignee: International Business Machines Corporation, Armonk, N.Y.

[21] Appl. No.: 622,965

[22] Filed: Mar. 27, 1996

[51] Int. Cl.$^6$ ........................................................ G06F 9/00
[52] U.S. Cl. ...................... 355/800.23; 395/391; 395/393; 395/392
[58] Field of Search ............................. 395/800.23, 391, 395/393, 392, 394

[56] References Cited

U.S. PATENT DOCUMENTS

| | | | |
|---|---|---|---|
| 4,574,349 | 3/1986 | Rechtschaffen | 364/200 |
| 4,992,938 | 2/1991 | Cocke et al. | 364/200 |
| 5,134,561 | 7/1992 | Liptay | 395/425 |
| 5,197,132 | 3/1993 | Steely, Jr. et al. | 395/375 |
| 5,261,071 | 11/1993 | Lyon | 395/425 |
| 5,280,615 | 1/1994 | Church et al. | 395/650 |
| 5,355,457 | 10/1994 | Shebanow et al. | 395/375 |
| 5,490,280 | 2/1996 | Gupta et al. | 395/80.23 |
| 5,560,025 | 9/1996 | Gupta et al. | 395/800.23 |
| 5,574,928 | 11/1996 | White et al. | 395/800.23 |
| 5,584,037 | 12/1996 | Papworth et al. | 395/800.23 |
| 5,627,984 | 5/1997 | Gupta et al. | 395/392 |
| 5,649,225 | 7/1997 | White et al. | 395/800.23 |

OTHER PUBLICATIONS

"General Purpose Register Extension," *IBM Technical Disclosure Bulletin*, vol. 24, No. 3, Aug. 1981, pp. 1404–1405.
"Use of a Second Set of General Purpose Registers to Allow Changing General–Purpose Registers During Conditional Branch Resolutions," *IBM Technical Disclosure bulletin*, vol. 29, No. 3, Aug. 1986, pp. 991–993.
"Simultaneous Source/Target Renaming of Multiple Instructions," *IBM Technical Disclosure Bulletin*, vol. 37, No. 4A, Apr. 1994, pp. 61–62.
"Register Renaming on Arithmetic," *IBM Technical Disclosure Bulletin*, vol. 37, No. 1, Jan. 1994, pp. 465–467.
"Superscalar Interrupt Garbage Collection Scheme," *IBM Technical Disclosure Bulletin*, vol. 37, No. 6B, Jun. 1994, pp. 531–533.
"New Algorithm for Performing Renaming in Super–Scalar Microprocessors," *IBM Technical Disclosure Bulletin*, vol. 37, No. 10, Oct. 1994, pp. 143–145.
Uvieghara et al. An On–Chip Smart Memory for a Data Flow CPU, IEEE, 1990.
Asato et al. A IU–Port 3.8ns 116–Word 64b Read–Renaming Register File, 1995.

*Primary Examiner*—Larry D. Donaghue
*Attorney, Agent, or Firm*—George E. Clark; Jenkens & Gilchrist; Anthony V. S. England

[57] ABSTRACT

A method and apparatus for looking up source matches in a central processing unit (CPU) is utilized to identify dependencies between instructions that have been renamed via buffer renaming techniques. In such instances, when a particular instruction's source is a previous instruction's destination, that match needs to be identified such that dependent relationships between instructions are maintained. The source lookup method and apparatus utilize an allocation pointer and deallocation pointer, which point to the rename buffer, to produce a comparison window. For a given source of a given instruction, the comparison window is used to compare whether the source in question has a match within the rename buffer. If only one match is found, that rename buffer location is flagged to indicate that this particular location has a dependent relationship with the current source in question. If more than one match has been identified, a selection is made to choose the buffer location closest to the allocation pointer.

19 Claims, 12 Drawing Sheets

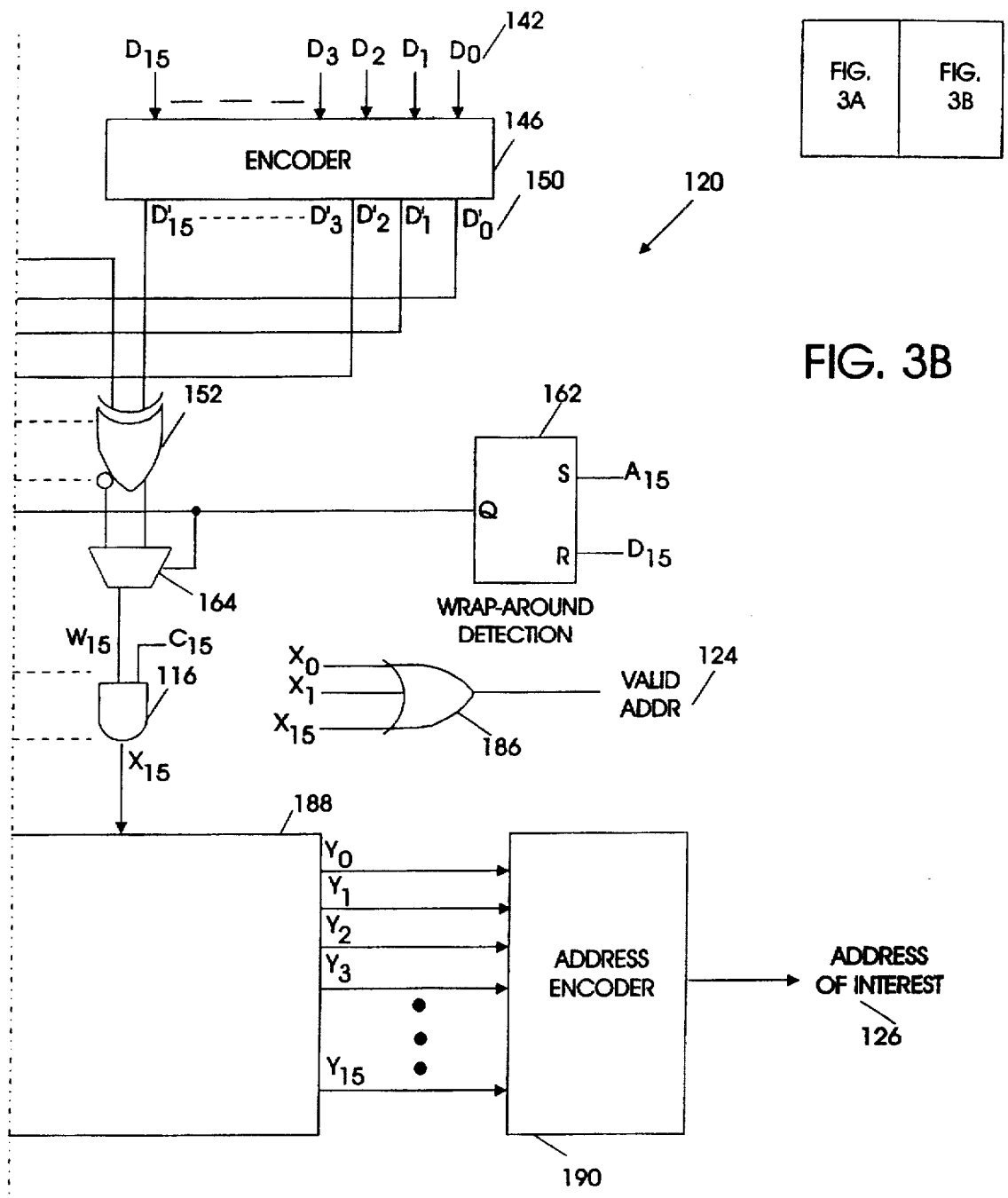

FIG. 4A
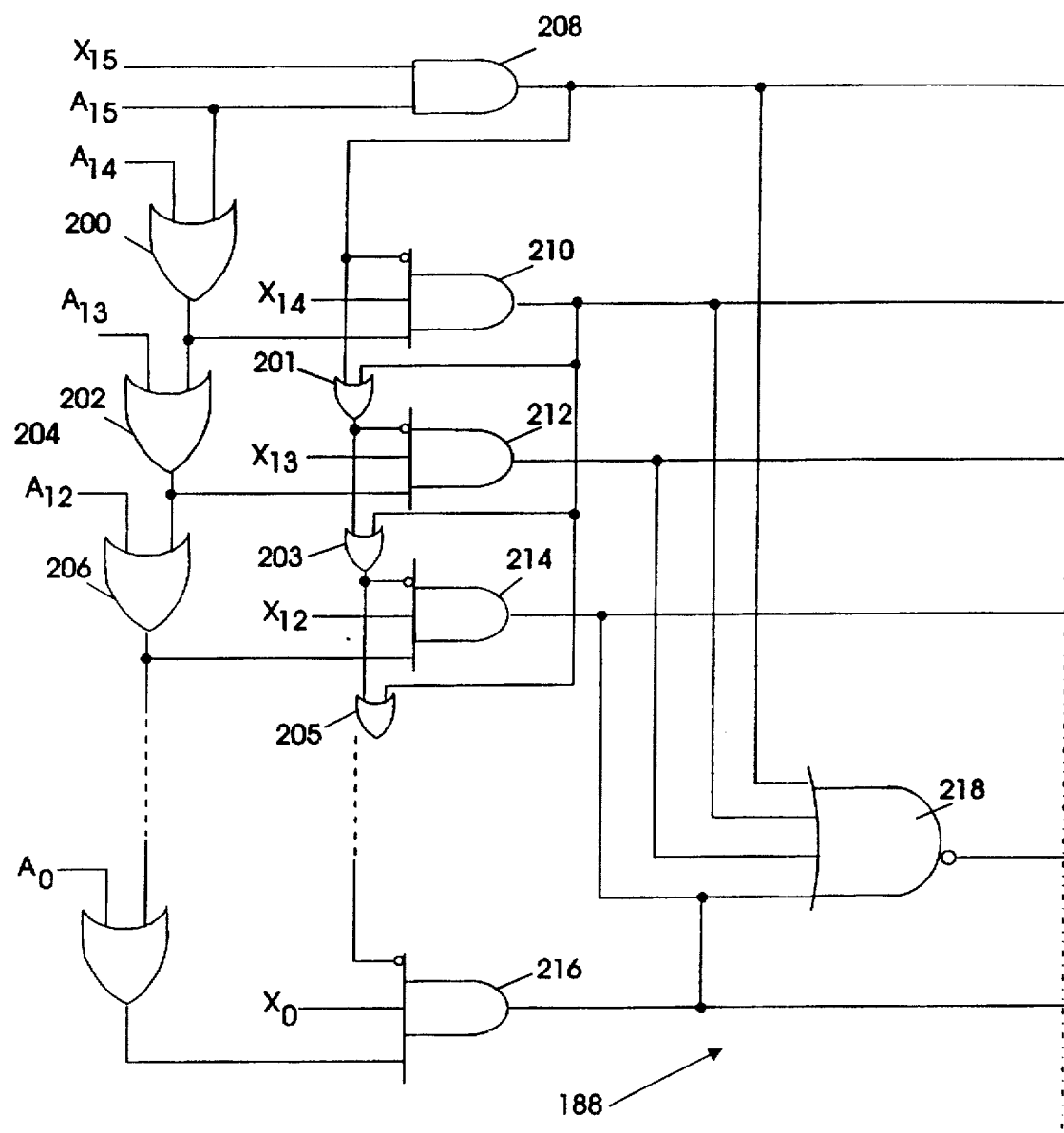
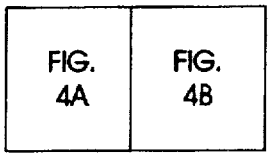
FIG. 4

CYCLE 1

INSTR #1  12 ← A, B, C (AP=0)

INSTR #2  11 ← D, E, F (AP=1)

INSTR #3  13 ← G, H, J (AP=2)

RENAME BUFFER
(READY FOR CYCLE 2)

CYCLE 2

INSTR #4  17 ← K, L, 12 (AP=3)

INSTR #5  18 ← M, N, O (AP=4)

INSTR #6  19 ← P, Q, R (AP=5)

RENAME BUFFER
(READY FOR NEXT CYCLE)

CYCLE 3

INSTR #7  22 ← S, T, 12 (AP=6)

INSTR #8  23 ← U, V, 17 (AP=7)

INSTR #9  24 ← X, Y, Z (AP=8)

RENAME BUFFER
(READY FOR NEXT CYCLE)

FIG. 6

CYCLE N

INSTR #n    1 ← 27, A, B, (AP=15)

INSTR #n +1   2 ← X, C, F (AP=0)

INSTR #n + 2   3 ← 32, L, M (AP=1)

|  |  |
|---|---|
| 1 | 15 |
| 31 | 14 |
| 32 | 13 |
| 31 | 12 |
| 32 | 11 |
| 32 | 10 |
| 28 | 9 |
| 27 | 8 |
|  | 7 |
|  | 6 |
|  | 5 |
|  | 4 |
|  | 3 |
|  | 2 |
| 3 | 1 |
| 2 | 0 |

DEALL PTR → (row 9)
ALLOC PTR → (row 1)

RENAME BUFFER
(READY FOR n + 1)

CYCLE n + 3

INSTR #m    4 ← 13, X, L (AP=8)

INSTR #m +1   5 ← 7, 18, A (AP=9)

INSTR #m + 2   6 ← 11, 12, 7 (AP=10)

|  |  |
|---|---|
| 1 | 15 |
| 32 | 14 |
| 31 | 13 |
| 30 | 12 |
| 29 | 11 |
| 6 | 10 |
| 5 | 9 |
| 4 | 8 |
| 13 | 7 |
| 13 | 6 |
| 14 | 5 |
| 13 | 4 |
| 12 | 3 |
| 11 | 2 |
| 3 | 1 |
| 2 | 0 |

ALLOC PTR → (row 11)
DEALL PTR → (row 1)

RENAME BUFFER
(READY FOR n + 4)

FIG. 7A

CYCLE 2
COMPARISON BANK COMPUTATIONS
FOR INSTR#4 @ DISPATCH OR EXECUTION
(SOURCE KORL)

| SIGNAL | 15 | 14 | 13 | 12 | 11 | 10 | 9 | 8 | 7 | 6 | 5 | 4 | 3 | 2 | 1 | 0 | NOTES |
|---|---|---|---|---|---|---|---|---|---|---|---|---|---|---|---|---|---|
| A | 0 | 0 | 0 | 0 | 0 | 0 | 0 | 0 | 0 | 0 | 0 | 0 | 1 | 0 | 0 | 0 | |
| D | 0 | 0 | 0 | 0 | 0 | 0 | 0 | 0 | 0 | 0 | 0 | 0 | 0 | 0 | 0 | 1 | |
| A' | 1 | 1 | 1 | 1 | 1 | 1 | 1 | 1 | 1 | 1 | 1 | 1 | 0 | 0 | 0 | 0 | 2'S COMP OF A |
| D' | 1 | 1 | 1 | 1 | 1 | 1 | 1 | 1 | 1 | 1 | 1 | 1 | 1 | 1 | 1 | 1 | 2'S COMP OF D |
| W | 0 | 0 | 0 | 0 | 0 | 0 | 0 | 0 | 0 | 0 | 0 | 0 | 1 | 1 | 1 | 1 | EXOR OF A' & D' (Q = 0) |
| C | 0 | 0 | 0 | 0 | 0 | 0 | 0 | 0 | 0 | 0 | 0 | 0 | 0 | 0 | 0 | 0 | NO MATCHES |
| X | 0 | 0 | 0 | 0 | 0 | 0 | 0 | 0 | 0 | 0 | 0 | 0 | 0 | 0 | 0 | 0 | NO MATCHES IN WINDOW |
| Y | 0 | 0 | 0 | 0 | 0 | 0 | 0 | 0 | 0 | 0 | 0 | 0 | 0 | 0 | 0 | 0 | VALID ADDR IS 0, THUS NOT A VALID ADDR |

FIG. 7B

CYCLE 3
FOR INSTR#8 @ DISPATCH OR EXECUTION
(SOURCE 17)

| SIGNAL | 15 | 14 | 13 | 12 | 11 | 10 | 9 | 8 | 7 | 6 | 5 | 4 | 3 | 2 | 1 | 0 | NOTES |
|---|---|---|---|---|---|---|---|---|---|---|---|---|---|---|---|---|---|
| A | 0 | 0 | 0 | 0 | 0 | 0 | 0 | 1 | 0 | 0 | 0 | 0 | 0 | 0 | 0 | 0 | |
| D | 0 | 0 | 0 | 0 | 0 | 0 | 0 | 0 | 0 | 0 | 0 | 0 | 1 | 0 | 0 | 0 | |
| A' | 1 | 1 | 1 | 1 | 1 | 1 | 1 | 0 | 0 | 0 | 0 | 0 | 0 | 0 | 0 | 0 | 2'S COMP OF A |
| D' | 1 | 1 | 1 | 1 | 1 | 1 | 1 | 1 | 1 | 1 | 1 | 1 | 1 | 0 | 0 | 0 | 2'S COMP OF D |
| W | 0 | 0 | 0 | 0 | 0 | 0 | 0 | 1 | 1 | 1 | 1 | 1 | 1 | 0 | 0 | 0 | EXOR OF A' & D' (Q = 0) |
| C | 0 | 0 | 0 | 0 | 0 | 1 | 1 | 0 | 0 | 0 | 0 | 1 | 0 | 0 | 0 | 0 | MATCHES |
| X | 0 | 0 | 0 | 0 | 0 | 0 | 0 | 0 | 0 | 0 | 0 | 1 | 0 | 0 | 0 | 0 | W ANDED W/C |
| Y | 0 | 0 | 0 | 0 | 0 | 0 | 0 | 0 | 0 | 0 | 0 | 1 | 0 | 0 | 0 | 0 | VALID ADDR |

FIG. 8A

CYCLE N
FOR INSTR#N+2 @ DISPATCH OR EXECUTION
(SOURCE 32)

| SIGNAL | 15 | 14 | 13 | 12 | 11 | 10 | 9 | 8 | 7 | 6 | 5 | 4 | 3 | 2 | 1 | 0 | NOTES |
|---|---|---|---|---|---|---|---|---|---|---|---|---|---|---|---|---|---|
| A | 0 | 0 | 0 | 0 | 0 | 0 | 0 | 0 | 0 | 0 | 0 | 0 | 0 | 1 | 0 | 0 | |
| D | 0 | 0 | 0 | 0 | 0 | 0 | 1 | 0 | 0 | 0 | 0 | 0 | 0 | 0 | 0 | 0 | |
| A' | 1 | 1 | 1 | 1 | 1 | 1 | 1 | 1 | 1 | 1 | 1 | 1 | 1 | 1 | 0 | 0 | 2'S COMP OF A |
| D' | 1 | 1 | 1 | 1 | 1 | 1 | 1 | 0 | 0 | 0 | 0 | 0 | 0 | 0 | 0 | 0 | 2'S COMP OF D |
| $\overline{W}$ | 1 | 1 | 1 | 1 | 1 | 1 | 1 | 0 | 0 | 0 | 0 | 0 | 0 | 0 | 1 | 1 | EXOR OF A' & D' (Q = 1, A HAS WRAPPED) |
| C | 0 | 0 | 1 | 0 | 1 | 1 | 0 | 0 | 0 | 0 | 0 | 0 | 0 | 0 | 0 | 0 | |
| X | 0 | 0 | 1 | 0 | 1 | 1 | 0 | 0 | 0 | 0 | 0 | 0 | 0 | 0 | 0 | 0 | $\overline{W}$ * C |
| Y | 0 | 0 | 1 | 0 | 0 | 0 | 0 | 0 | 0 | 0 | 0 | 0 | 0 | 0 | 0 | 0 | SELECTED VALID ADDR |

FIG. 8B

CYCLE n + 3
FOR INSTR#N, SOURCE 13 @ DISPATCH OR EXECUTION

| SIGNAL | 15 | 14 | 13 | 12 | 11 | 10 | 9 | 8 | 7 | 6 | 5 | 4 | 3 | 2 | 1 | 0 | NOTES |
|---|---|---|---|---|---|---|---|---|---|---|---|---|---|---|---|---|---|
| A | 0 | 0 | 0 | 0 | 0 | 0 | 0 | 1 | 0 | 0 | 0 | 0 | 0 | 0 | 0 | 0 | |
| D | 0 | 0 | 0 | 0 | 0 | 0 | 0 | 0 | 0 | 0 | 0 | 0 | 0 | 0 | 1 | 0 | |
| A' | 1 | 1 | 1 | 1 | 1 | 1 | 1 | 1 | 0 | 0 | 0 | 0 | 0 | 0 | 0 | 0 | 2'S COMP OF A |
| D' | 1 | 1 | 1 | 1 | 1 | 1 | 1 | 1 | 1 | 1 | 1 | 1 | 1 | 1 | 1 | 0 | 2'S COMP OF D |
| W | 0 | 0 | 0 | 0 | 0 | 0 | 0 | 1 | 1 | 1 | 1 | 1 | 1 | 1 | 1 | 0 | A' + D' (Q = 0, D HAS WRAPPED) |
| C | 0 | 0 | 0 | 0 | 0 | 0 | 0 | 1 | 1 | 0 | 1 | 0 | 0 | 0 | 0 | 0 | |
| X | 0 | 0 | 0 | 0 | 0 | 0 | 0 | 1 | 1 | 0 | 1 | 0 | 0 | 0 | 0 | 0 | W * C |
| Y | 0 | 0 | 0 | 0 | 0 | 0 | 0 | 0 | 1 | 0 | 0 | 0 | 0 | 0 | 0 | 0 | |

METHOD AND APPARATUS FOR SOURCE LOOKUP WITHIN A CENTRAL PROCESSING UNIT

TECHNICAL FIELD OF THE INVENTION

The present invention relates to information handling systems and methods for operating information handling systems, and more particularly to information handling systems and methods including means for renaming architected registers.

BACKGROUND OF THE INVENTION

The design of a typical computer data processing system requires the establishment of a fixed number of addressable registers, such as general purpose registers (GPRs) and floating-point registers (FPRs), for the programmer to use in designing programs for the data processing system. Changing the number of architecturally available registers once a system is available would require substantial rewriting of programs to make use of the newly added registers.

The design of computers and computer programs is also based on the assumption that computer data processing system program instructions are executed by the data processing system in the order in which they are written in the program and loaded into the data processing system. While instructions must logically appear to the data processing system to have been executed in program order, it has been learned in an effort to improve computer performance that some instructions do not have to be physically performed in program order, provided that certain dependencies do not exist with other instructions. Further, if some instructions are executed out of order, and one of such instructions is a branch instruction, wherein a branch prediction is made to select the subsequent instruction sequence, a need to restore the registers affected by instructions in the predicted branch to their original values can occur if the branch is mispredicted. In such a case, the data processing system is restored to the condition before the branch was taken. The process of efficiently executing instructions out of order requires that values for registers prior to the predicted branch be maintained for registers affected by the instructions following the branch, while provision is made to contingently store new values for registers affected by instructions precede the predicted branch. When branch instructions are resolved, the contingency of the new register values is removed, and the new values become the established values for the registers.

Large processors have for many years employed overlapping techniques under which multiple instructions in the data processing system are in various states of execution at the same time. Such techniques may be referred to as pipelining. Whenever pipelining is employed, control logic is required to detect dependencies between instructions and alter the usual overlapped operation so that results of the instructions are those that follow the one-instruction-at-a-time architectural data processor model. In a pipelined machine, separate hardware is provided for different stages of an instruction's processing. When an instruction finishes its processing at one stage, it moves to the next stage, and the following instruction may move into the stage just vacated.

In many pipelined machines, the instructions are kept in sequence with regard to any particular stage of its processing, even though different stages of processing for different instructions are occurring at the same time. If the controls detect that a result that has not yet been generated is needed by some other executing instruction, the controls must stop part of the pipeline until the result is generated and passed to the part of the pipeline where it is needed. Although this control logic can be complex, keeping instructions in sequence in the pipeline helps to keep the complexity under control.

A more complex form of overlapping occurs if the data processing system includes separate execution units. Because different instructions have different execution times in their particular type of execution unit, and because the dependencies between instructions will vary in time, it is almost inevitable that instructions will execute and produce their results in a sequence different from the program order. Keeping such a data processing system operating in a logically correct manner requires more complex control mechanisms than that required for pipeline organization.

One problem that arises in data processing systems having multiple execution units is providing precise interrupts at arbitrary points in program execution. For example, if an instruction creates an overflow condition, by the time such overflow is detected, it is entirely possible that a subsequent instruction has already executed and placed a result in a register or in main storage—a condition that should exist only after the interrupting instruction has properly executed. Thus, it is difficult to detect an interruption and preserve status of the data processing system with all prior but no subsequent instructions having been executed. In this example, the overflow interrupt will actually be recognized later than it occurred. Other similar situations are possible in the prior art.

Designers of some prior art data processing systems chose to handle interrupts by allowing all instructions that were in some state of execution at the time of the interrupt to complete their execution as much as possible, and then take an "imprecise" interrupt which reported that some instruction in the recent sequence of instructions had created an interrupt condition. This may be a reasonable way to handle interrupts for conditions such as overflow, where results will be returned to a programmer who will fix a program bug or correct the input data, and then rerun the program from the beginning. However, this is an unacceptable way to handle interrupts like page faults, where the system program will take some corrective action and then resume execution from the point of interruption.

Applicant is aware of U.S. Pat. No. 4,574,349, in which additional registers are provided to be associated with each GPR and in which register renaming occurs with the use of a pointer value. However, this patent does not solve the problem of precise recovery from interrupts or recovery from incorrectly guessed branches during out-of-order execution.

U.S. Pat. Nos. 4,901,233 and 5,134,561, which is a division of the 233 patent, teach a register management system which has more physical registers for general purpose use than are named in the architecture system. A renaming system identifies particular physical registers to perform as architected addressable or general purpose registers. An array control list (ACL) is provided to monitor the assignment and status of the physical registers. A decode register assignment list (DRAL) is provided to monitor the status of all of the architected registers and the correspondence to physical registers. A backup register assignment list (BRAL) is used to preserve old status information while out-of-sequence and conditional branch instructions are executed. The physical registers may retain multiple copies of individual addressable registers representing the contents at different stages of execution. The addressable register status may be restored if instruction execution is out of sequence or on a conditional branch causing a problem requiring restoration. The register management system may be used on a processor having multiple execution units of different types.

An article in the IBM Technical Disclosure Bulletin, entitled "General Purpose Register Extension," August 1981, pp. 1404–1405, discloses a system for switching between multiple GPR sets to avoid use of storage when switching subroutines.

Another article in the IBM Technical Disclosure Bulletin, entitled "Vector-Register Rename Mechanism," June 1982, pp. 86–87, discloses the use of a dummy register during instruction execution. When execution is complete, the register is renamed as the architected register named by the instruction for receiving results. During execution, the register is transparent and this allows for extra physical registers. However, neither of these articles deals with the problems caused by out-of-order instruction execution.

An article in the IBM Technical Disclosure Bulletin, entitled "Use of a Second Set of General Purpose Registers to Allow Changing General-Purpose Registers During Conditional Branch Resolutions," August 1986, pp. 991–993, shows a one-for-one matched secondary set of GPRs to hold the original GPR contents during conditional branch resolution so that such GPR contents may be used to restore the system status if necessary. Conditional mode tags are used with the GPRs to regulate status of the registers or to restore the original contents of the register.

An article in the IBM Technical Disclosure Bulletin, Volume 10A March 1992 at pages 449 to 454 shows a technique for exploiting parallelism in which a set of architected register names is mapped to a larger set of physical names so that many physical locations can be aliased to a single architected name. The technique allows for precise interrupts in out of sequence operations.

Prior Art

In the prior art there are many techniques for renaming architected registers. The following are examples of the prior art.

U.S. Pat. No. 4,992,938 discloses renaming source and target registers. The renaming process involves a map table containing the physical register numbers which will be used to replace architected register numbers. The disclosed renaming technique employs three register queues for the mapping functions.

U.S. Pat. No. 5,280,615 discloses renaming storage locations and using instruction queues to perform out-of-order instruction execution. Register access is implemented by performing mapping operations by a table called an address couple associative memory (ACAM).

U.S. Pat. No. 5,197,132 discloses register renaming using a backup map and a predicted map enabling a pipeline to backtrack to the point at which an incorrect instruction was issued, and beginning again using the corrected register values at that point.

U.S. Pat. No. 5,355,457 discloses out-of-order instruction processing where mapping of physical registers to logical registers is performed using content addressable memories (CAM), eliminating the need for mapping tables. Branch repair when the branch prediction is incorrect involves a source lookup performed by a sequencer. This source lookup consists of backtracking to the checkpoint where the incorrect instruction was issued.

U.S. Pat. No. 5,261,071 discloses out-of-order instruction processing using a store history table. A dual type cache memory enables the load and store instructions to be issued out of order with respect to the instruction sequence in memory. Since subsequent load operations dependent on incomplete store operations can be reissued at a later time, instructions must be queued.

BRIEF DESCRIPTION OF THE DRAWINGS

FIG. 3A–3B illustrates a schematic block diagram of the comparison bank of FIG. 2;

FIG. 4A–4B illustrates a schematic diagram of the selection circuit of FIG. 3; and FIGS. 5–6, 7A, 7B, 8A, 8B illustrate an example of the present invention.

DETAILED DESCRIPTION OF A PREFERRED EMBODIMENT

Generally, the present invention provides a method and apparatus for looking up source matches in a central processing unit (CPU). Source lookup is utilized to identify dependencies between instructions that have been renamed via buffer renaming techniques. In such instances, when a particular instruction's source is a previous instruction's destination, that match needs to be identified such that dependent relationships between instructions are maintained. The source lookup method and apparatus of the present invention utilize an allocation pointer and deallocation pointer, which point to the rename buffer to generate a comparison window. For a given source of a given instruction, the comparison window is used to compare whether the source in question has a match within the rename buffer between the allocation pointer and deallocation pointer. If only one match is found, that rename buffer location is flagged to indicate that this particular location has a dependent relationship with the current source in question. If more than one match has been identified, a selection is made to choose the buffer location closest to the allocation pointer. With such a method and apparatus, the present invention substantially reduces the number of comparisons, current status bits, and overall complexity of prior art source lookup methods and apparatuses.

Figure 1:
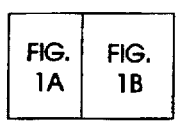
FIG. 1A–1B illustrates a schematic block diagram of a central processing unit incorporating the teachings of the present invention.
Figure 1A:
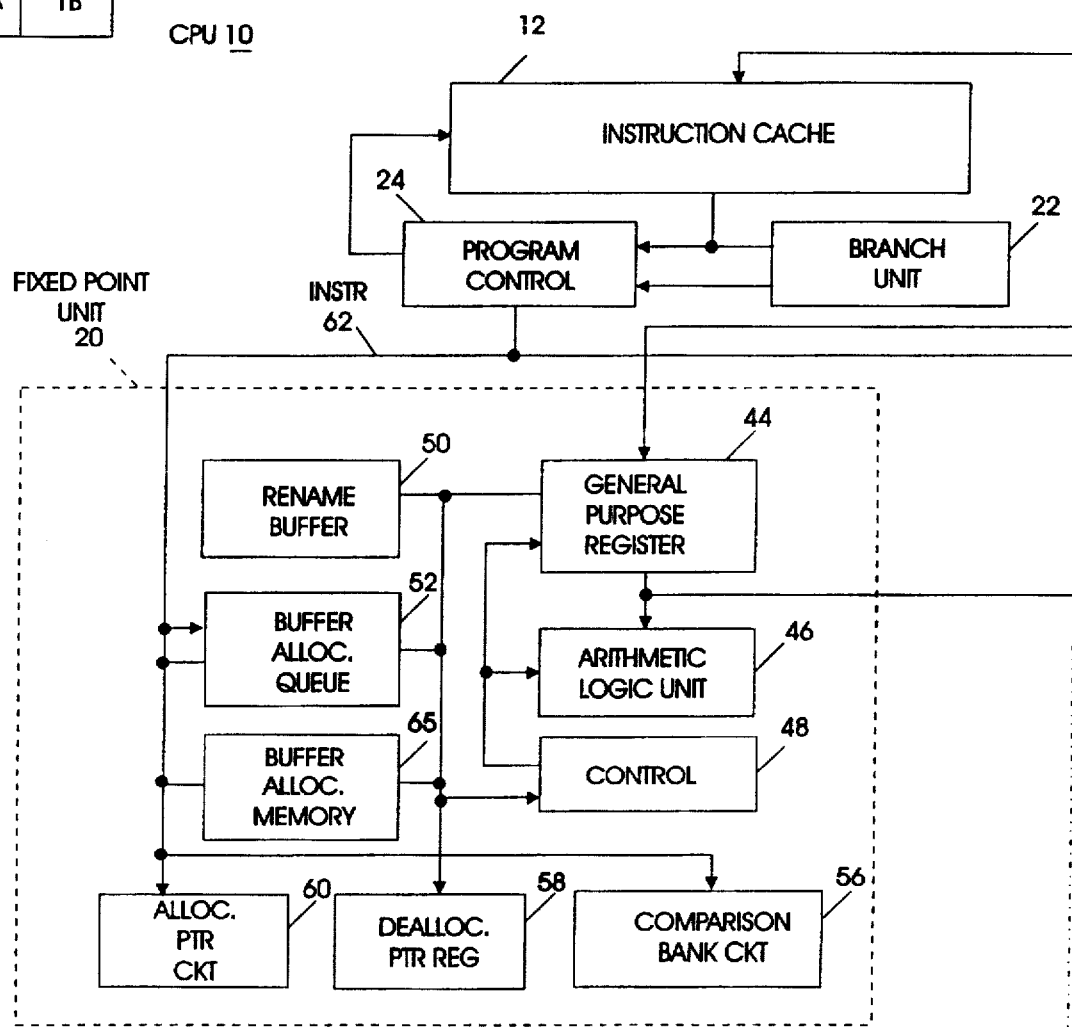
Figure 1B:
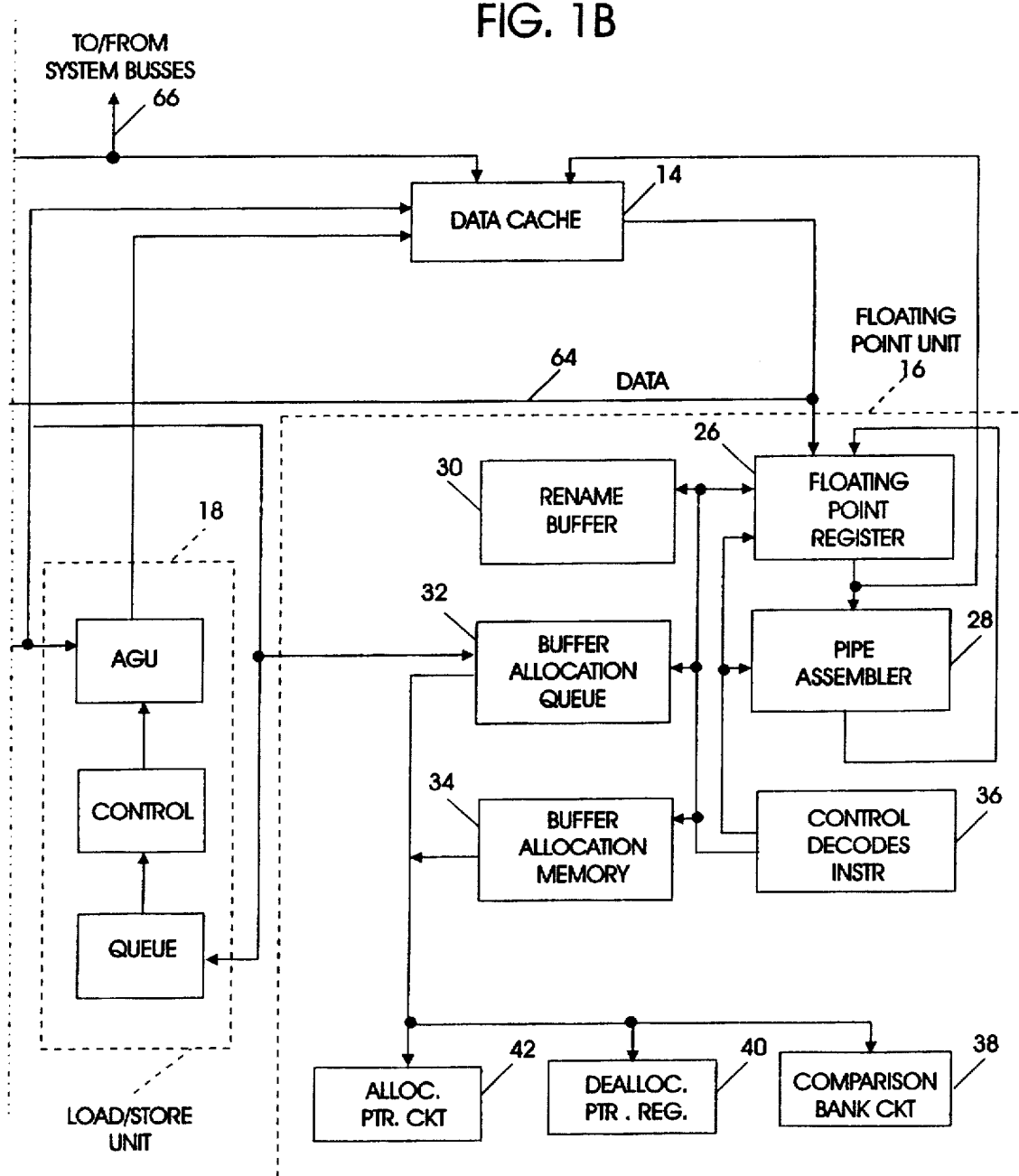

The present invention can be more fully described with reference to FIGS. 1–8. FIG. 1 illustrates a central processing unit (CPU) 10 that includes an instruction cache 12, a data cache 14, a floating point unit 16, a load/store unit 18, a fixed point unit 20, a branch unit 22, and a program control unit 24. The floating point unit 16 includes a floating point register 26, a pipe assembler 28, a rename buffer 30, a buffer allocation queue 32, a buffer allocation memory 34, control circuitry 36, a comparison bank circuit 38, a deallocation pointer register 40, and an allocation pointer circuit 42. The fixed point unit 20 includes a general purpose register 44, an arithmetic logic unit 46, control circuitry 48, a rename buffer 50, a buffer allocation queue 52, a buffer allocation memory 54, a comparison bank circuit 56, a deallocation pointer register 58, and an allocation pointer circuit 60. The operations of the comparison banks 38, 56, the deallocation pointers 40, 58, the allocation pointer circuits 42, 60, the buffer allocation memory 54, 34, the buffer allocation queue 52, 32, and the rename buffer 50, 30 operate in similar manners whether in the fixed point unit 20 or in the floating point unit 16. In an embodiment of the present invention, the floating point register or the general purpose register may be a 32-byte register, while the rename buffer may have 16 locations.

Figure 2A:
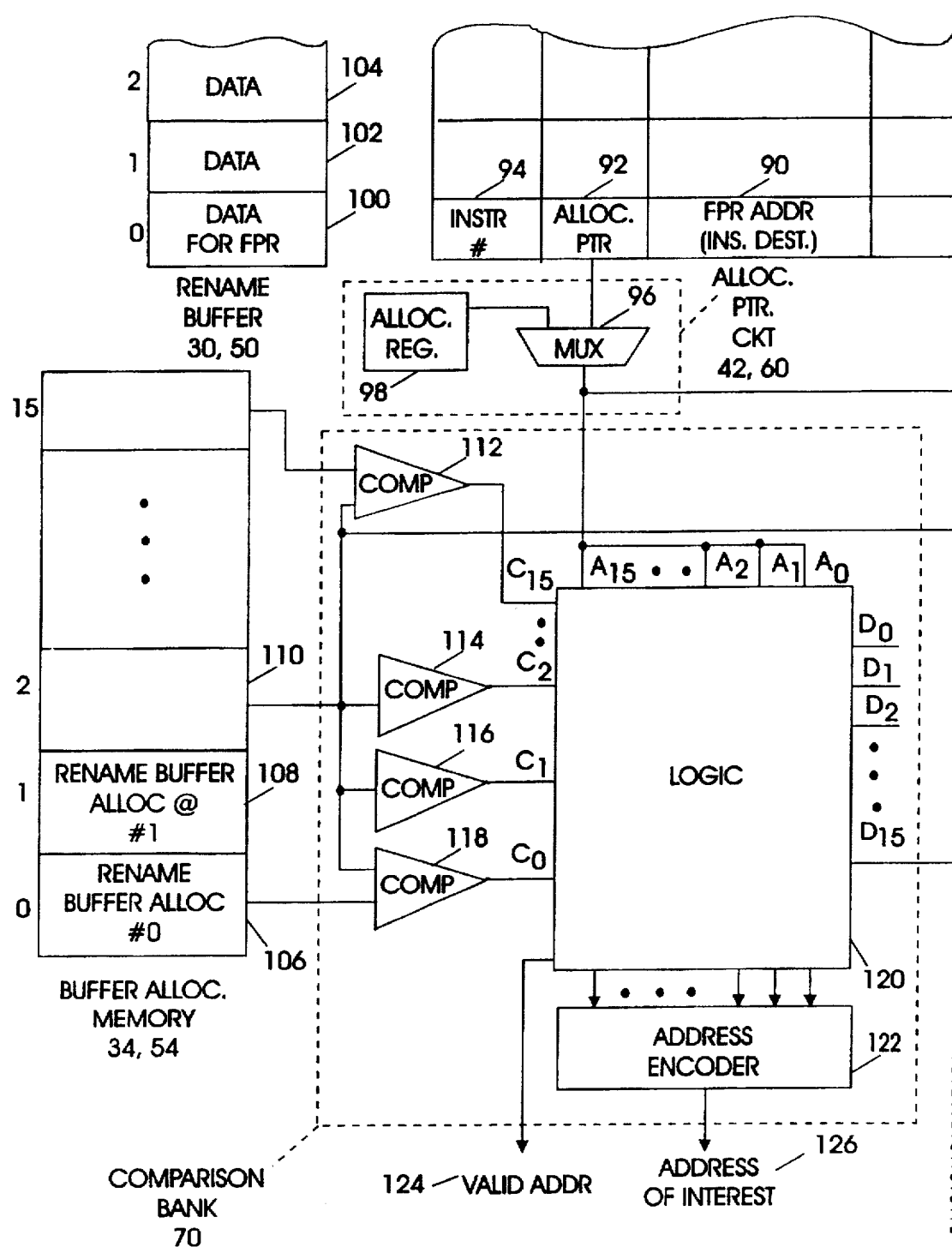
FIG. 2A–2B illustrates a schematic block diagram of the comparison bank circuit of FIG. 1.
Figure 2B:
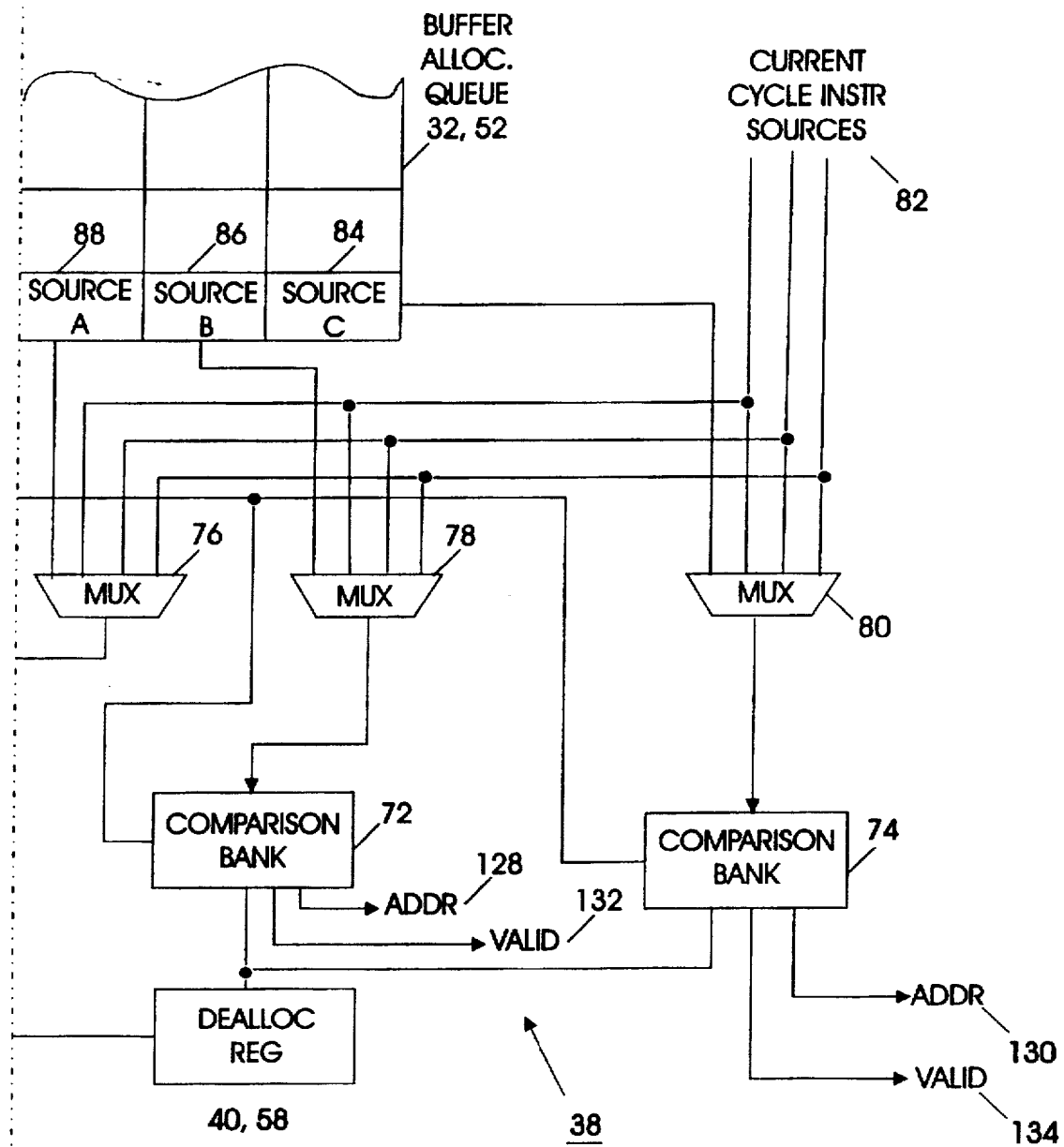

FIG. 2 illustrates a more detailed schematic block diagram of a portion of the fixed point unit 20 or the floating point unit 16. As shown, the rename buffer 30, 50, includes a predetermined number of storage locations or entries that store data for particular register addresses. As is known, the rename buffer 30, 50, which includes entries 100–104, is utilized as a temporary storage location for out-of-order instruction executions as previously described. The buffer allocation queue 32, 52 includes fields for storing the instruction number 94, the allocation pointer 92, the register's address 90 (the instruction's destination address within the register), a first source address 88, a second source address 86, and a third source address 84. Each of the source fields 84–86 are coupled to multiplexors 76, 78, 80. The multiplexors are controlled by the central processing unit, wherein when the source lookup is to be performed at dispatch (i.e., when the rename process is taking place), the multiplexors select the current cycle instruction sources 82 as the inputs for the multiplexors 76, 78, 80. If, however, the source lookup is to be done at execution, the central processor controls the multiplexors 76, 78, 80 to receive the source information stored in source fields 84, 86, 88.

The allocation pointer circuit 42, 60 includes a multiplexor 96 and an allocation register 98. The allocation register stores the current allocation pointer into the rename buffer. When the CPU selects to perform source lookup at dispatch, the multiplexor selects, as its input, the information stored in allocation register 98. If, however, source lookup is to be performed at execution, the multiplexor selects the information stored in the allocation pointer field 92 of the allocation queue 32, 52.

The comparison bank circuit 38, 56 includes a plurality of comparison bank circuits 70, 72, 74. Each of these comparison banks 70, 72, 74 includes identical circuitry; thus only a discussion regarding one comparison bank will be presented. As shown, comparison bank 70 includes a plurality of comparators 112–118. Each of the comparators 112–118 has a common input which is couple to the output of multiplexor 76. Thus, when source lookup is being perform at execution, the comparison source value will be provide as the information stored in source A field 88. The other input of each of the comparator 112–118 is couple to buffer allocation memory 34, 54. Each entry 106–110 of the buffer allocation memory 34, 54 stores the rename buffer allocation (i.e., the destination address) for the particular instruction stored in a particular location of the rename buffer. For example, if the rename buffer includes 16 pieces of data, the register destination address stored in location 0 will also be stored in buffer allocation memory 34, 54 at location 0. The output of the comparators 112–118 is provided to a logic circuit 120 along with a binary representation of the allocation pointer and a binary representation of the deallocation pointer. In addition, the logic circuit 120 produces a valid address indicator 124. From these inputs, the logic circuit 120 produces a binary signal which is provided to the address encoder 122. The address encoder 122 interprets the binary signals to produce a five-bit address which corresponds to an address in the register. This address is considered to be one of interest 126 if the valid address bit 124 is set.

As shown, each comparison bank 70, 72, 74 produces an address of interest 126, 128, 130 and a valid address signal 124, 132, 134. Given the circuit shown, three simultaneous comparisons can be obtained utilizing this circuit. Contrasting this with the prior art implementations, the number of comparisons needed is reduced from 144 to 48 for source comparisons, reduced from 48 to 16 for destination comparisons and eliminated the need for current bit registers and associated manipulations. As one skilled in the art will readily appreciate, when the number of comparisons needed is substantially reduced, as is the case with the present invention, the real estate needed within an integrated circuit layout is substantially reduced. With such reductions in real estate, an integrated circuit may be made smaller, thereby enhancing its marketability.

Figure 3A:
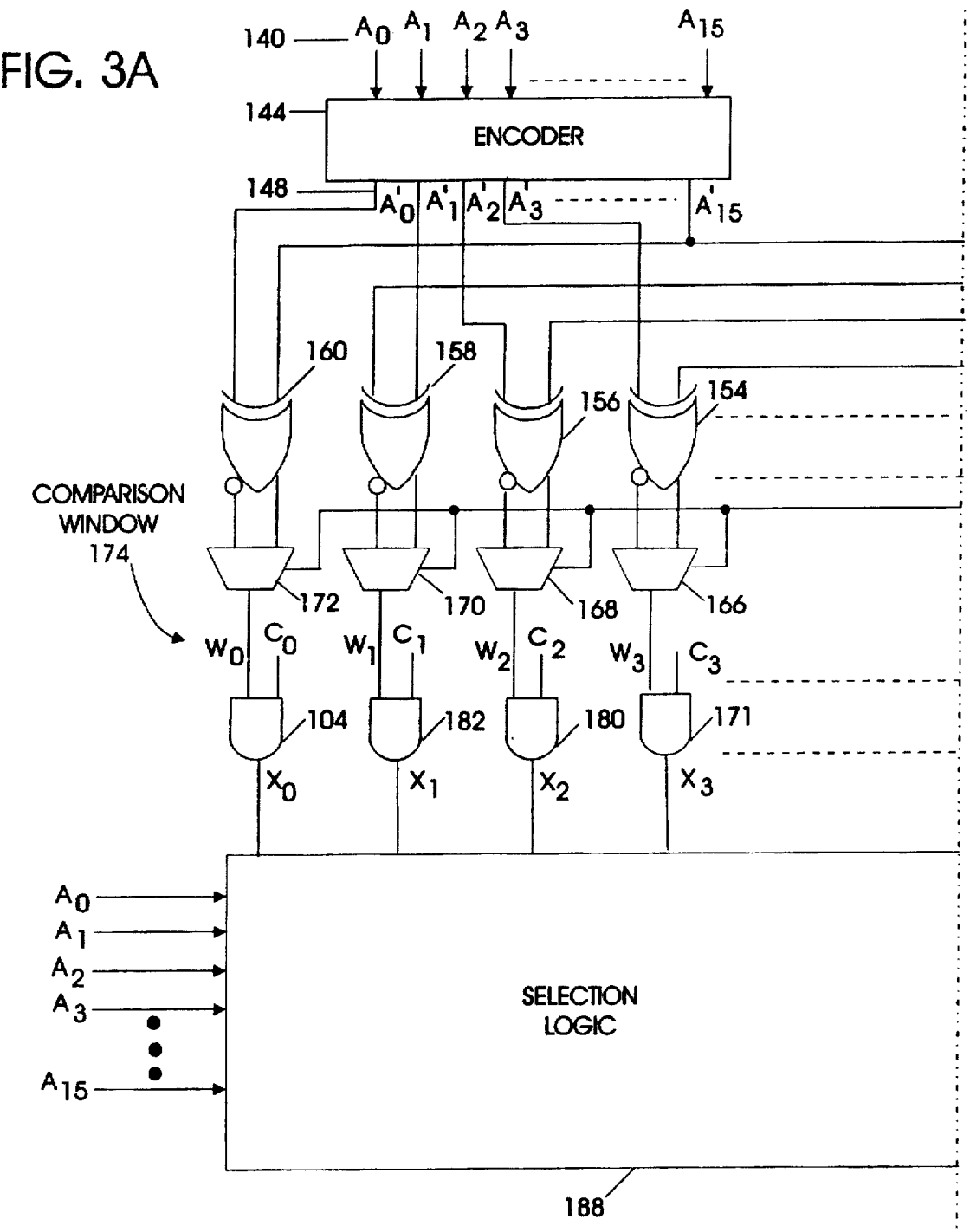

FIG. 3 illustrates a schematic diagram of the logic circuit 120 of FIG. 2. As shown, the binary representations of the allocation pointer 140 is provided to an encoder 144. The encoder 144 may be a two's complement encoder which produces an encoded binary signal 148. Similarly, the binary representation of the deallocation pointer 142 is provided to an encoder 146. The encoder 146 may be a two's complement encoder which produces the encoded binary signal 150. The binary encoded signals 148 and 150 are then exclusive ORed by a plurality of exclusive OR gates 152–160. The output of the exclusive OR gates 152–160 and its complements are provided to a plurality of multiplexors 164–172. Control of the multiplexors is determined by a wraparound detection circuit 162. When the output (Q) is high, logic 1, the complement output of the exclusive OR gates 152–160 is selected as the comparison window 174. If, however, the output (Q) is 0, the exclusive OR output is selected by multiplexors 164–172 as the comparison window 174. Note that the output (Q) is set when the 15th bit location of the allocation pointer is high and is subsequently reset when the 15th bit location of the deallocation pointer is set. This allows the wraparound function within the rename buffer to occur and still maintain proper orientation between the allocation pointer and the deallocation pointer.

The output of the multiplexors 164–172 provides the comparison window 174. This comparison window 174 is ANDed with the output of each of the comparators 112–118 by AND gates 176–184. The resulting output of these AND gates 176–184 is provided to the selection logic circuit 188. In addition, the selection logic circuit 188 has, as inputs, the binary representation of the allocation pointer 140. From these input signals, the selection logic 188 produces an output which is provided to the address encoder 190 which subsequently produces the address of interest 126.

The valid address indication signal 124 is produced by an OR gate 186. The input to OR gate 186 is each of the outputs produced by the ANDing of the comparison window 174 with the outputs of comparator 112–118. This signal will provide an indication as to whether at least one of the entries in the rename buffer has an address of interest. For the purposes of this discussion, an address of interest is one wherein the current instruction has a source which is also a destination of an instruction in the rename buffer between the allocation pointer and the deallocation pointer. This will be discussed in more detail with references to FIGS. 5–8 below.

Figure 4B:
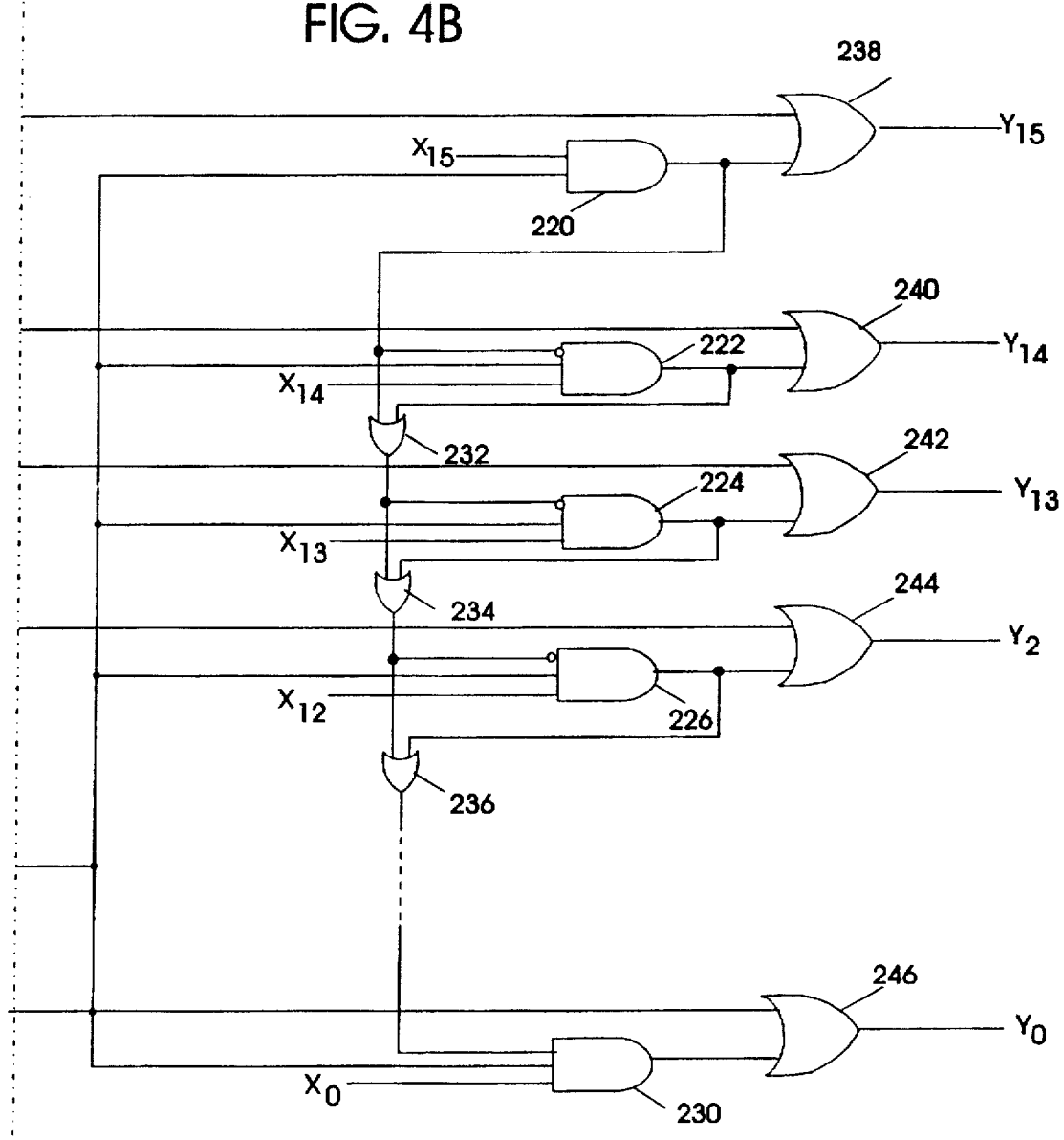

FIG. 4 illustrates a schematic of the selection logic circuit 188 of FIG. 3. As shown, the circuit includes a plurality of OR gates 200–206, a plurality of AND gates 208–216, a NOR gate 218, a plurality of OR gates 232–236, a plurality of AND gates 220–230, and a plurality of OR gates 238–246. The purpose of the selection circuit 188 is to select the address of interest that is closest to the allocation pointer. This is needed to insure that the most current source information is being accessed at the time the current instruction is being executed.

As shown, the circuit essentially contains two portions: the first portion is comprised of the plurality of AND gates 208–216 and OR gates 200–206, and the second portion includes the plurality of AND gates 220–230 and the plurality of OR gates 232–236. Due to the wraparound function of the rename buffer, the selection of an address of interest has to be done in two stages. The first stage determines if, between the allocation pointer and address 0, there is a match address. The second portion determines whether, when there was no match found in the first portion, whether there is a match from the highest bit location (Xis) down to the allocation pointer. This will be more fully explained with references to FIGS. 5–8.

Figure 5:
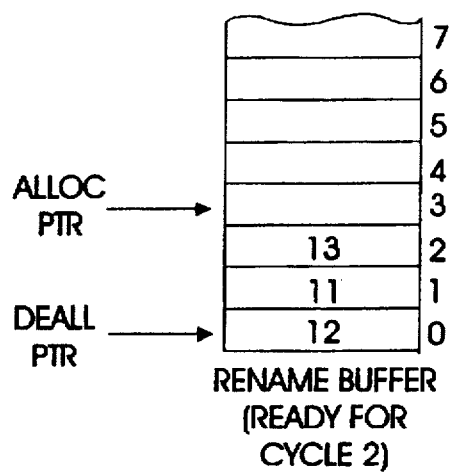
Figure 5:
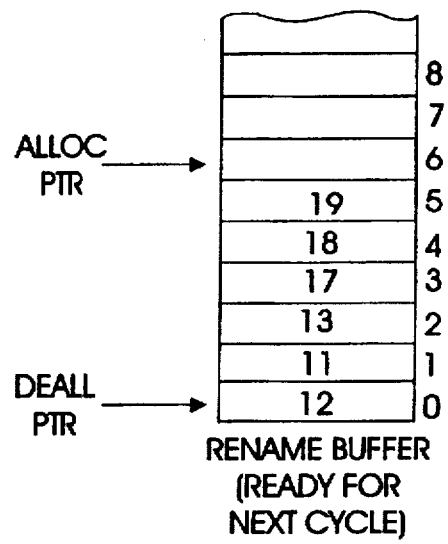
Figure 5:
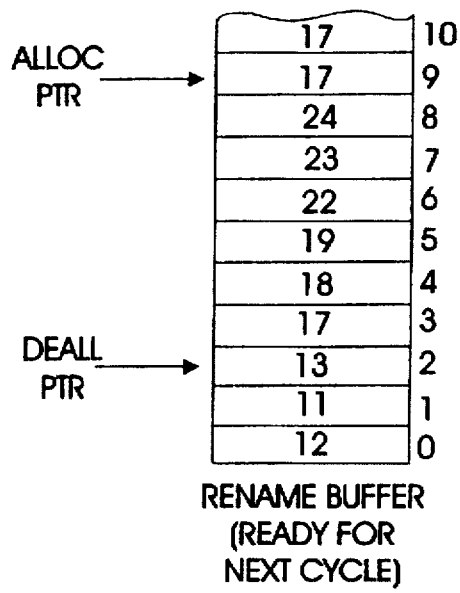

FIG. 5 illustrates the first three cycles of instructions being loaded into the CPU. The illustration shown is based on the assumption that, for each given cycle, the CPU can fetch up to three instructions. In addition, it is assumed that each instruction can have up to three sources. Given these parameters, for the first cycle, instructions 1, 2, and 3 have been fetched. Instruction 1 is shown to have a destination address (e.g., 12) within the register (i.e., the general purpose register or the floating point register), has sources of address A, B, and C and an allocation pointer of 0 (AP=0). Note that these source addresses may be within the general purpose register, the floating point register, the data cache, or the rename buffer. Also shown is the allocation of entries within the rename buffer to the instructions. Instruction 1 is allocated entry 0, instruction 2 is allocated entry 1, and instruction 3 is allocated entry 2. Note that because no instructions have been executed, the deallocation pointer remains at 0 while the allocation pointer has been incremented to the next available entry within the rename buffer.

At cycle 2, three more instructions have been fetched. Instruction 4 has a destination address of 17 and sources of K, L, and 12. Note that source 12 is the destination address for instruction 1. Given this, the source lookup process is required to identify instruction 4 as being dependent upon instruction 1. Therefore, before instruction 4 can be executed, instruction 1 has to be executed. Also shown is the rename buffer being updated to include instructions 4, 5, and 6. Note that at this time, no instruction has been completed; thus, the deallocation pointer remains pointing at address 0 of the rename buffer. Also note that the allocation pointer has been incremented to point to the next available location in the rename buffer.

At cycle 3, instructions 7, 8, and 9 are fetched. Note that instruction 7 has a destination address of 22 and sources of S, T, and 12. Also note that the rename buffer has been updated to include these instructions. Further note that instructions 1 and 2 have been completed such that the deallocation pointer now is pointing to the next instruction to be completed and thus removed from the rename buffer.

Referring to FIG. 6, at cycle n—which is sometime later—instructions n, n+1, and n+2 are received. Note that instruction n has a destination address of 1 and sources of address 27, A, and B. The rename buffer is updated to show the allocation pointer has wrapped around the rename buffer and is currently pointing to location 2. Also note that the deallocation pointer is pointing to address 9 which is the next instruction to be completed and thus removed from the rename buffer. At cycle n+3, instructions m, m+1, and m+2 are received and subsequently entered into the rename buffer. At this time, the deallocation pointer has wrapped around the rename buffer and is currently pointing to location 1 while the allocation pointer is currently pointing to location 11. Given these parameters, the information between address 1 and address 11 is relevant to the instruction corresponding to the entry in address 11, while the information in location 0, 1, 12–15 are of no interest.

FIG. 7 illustrates the computational functions of the comparison bank circuit 70 of FIGS. 2–4 for the cycles of FIG. 5. The example provided is during cycle 2 for instruction 4 and sources K or L. Note that this information is the same whether the comparison is being done at dispatch or at execution. As can be seen, the allocation pointer (A) has a 1 at bit location 3 with the remaining bit locations containing 0. The deallocation pointer (D)) has a 1 in bit location 0 with the remaining bit locations containing a 0. The allocation pointer is then encoded (see FIG. 3 encoder 144) to produce the encoded allocation pointer (A'). As shown, the encoded allocation pointer is the two's complement of the allocation pointer. Similarly, the deallocation pointer is encoded (D')) using a two's complement function. These two values are then exclusively ORed together to produce the comparison window (W). Entries of interest will be represented by the comparison window (W) as a 1, while entries not of concern will be represented by logic 0. Note that neither the allocation pointer nor the deallocation pointer has wrapped around; thus, the output of the wraparound detection circuit 162 of FIG. 3 is 0, selecting (W) instead of (W').

The next entry shown is the comparison output (C) from the plurality of comparators (FIG. 3) and is shown to include all 0s. This results in that sources K or L are not destinations of entries of interest. In other words, instructions stored in the entries of the rename buffer do not have destination addresses of K or L. From this, the resulting comparison output of all 0s is obtained. The comparison output is then ANDed with the comparison window to produce a potential address of interest signal (X) (i.e., only looking at entries between the allocation pointer and the deallocation pointer). The potential address of interest is then provided into the selection circuit to determine the exact address of interest (Y). As shown, and referring to FIG. 4, it is clear that there is no address of interest.

The example continues at cycle 3 for instruction 8 and source 17. Again note that the same data is used for the source lookup whether it is being performed at dispatch or at execution. The allocation pointer is shown to be pointing at bit location 8 while the deallocation pointer is pointing to location 2. The two's complements are taken of both the allocation pointer and the deallocation pointer to produce the values shown. These values are exclusive ORed to produce the comparison window.

Referring simultaneously to FIG. 5 and FIG. 7 for cycle 3, it is shown that instruction 8 has a destination of 23, and one of its sources is address 17. Referring to the rename buffer of FIG. 5, it is shown that the address 17 is stored in location 3, 9, and 10. For this particular example, the potential addresses of interest are between the allocation pointer and the deallocation pointer; thus, the destination addresses stored in locations 9 and 10 are not of interest. Referring back to FIG. 7, and the cycle 3 example, it is shown that the comparison output C produces a 1 in bit locations 3, 9, and 10. When this value is ANDed with the comparison window, the matches found in bit locations 9 and 10 are removed, thereby leaving the match found in bit location 3 as the only address of interest. This is then provided through the selection circuit and, being the only address of interest, is provided to the address encoder.

Referring now to FIGS. 6 and 8 simultaneously, an example of cycle n, instruction n+2, source 32, will be discussed. Note that for instruction n+2, its destination address is 3 while it has a source of 32. Referring to the rename buffer, address 32 appears in locations 10, 11, and 13.

Referring to FIG. 8, the allocation pointer and deallocation pointer's binary representations are shown as is the two's complement of these pointers. Note that for this example, the allocation pointer has wrapped around the rename buffer, while the deallocation pointer has not. When this occurs, the wraparound circuit will produce a logic 1 output, thereby selecting the complement of the exclusive OR output (W'). This complement signal (W') is shown to include 1s for bit locations of concern and 0s for bit locations that are not of concern. ANDing the comparison window with the comparator output produces 1s at bit locations 9, 10, and 13, to produce the signal X.

Using this data and referring to FIG. 4 of the selection circuit, the selection circuit can be illustrated. As shown, the allocation pointer is provided as inputs to a plurality of OR gates 200, 202, 204, 206. The OR gates are cascaded from most significant bit to least significant bit. Once a bit is set, the lower priority bits will also be set while higher bits will not be set. For this example, the allocation pointer is pointing to bit location 2. Thus, the output of the OR gates 200, 202, 204, 206 corresponding to bit locations 0, 1, and 2 will be 1, while the remaining bits will be 0. This enables the bit locations to the right of the allocation pointer to be checked first. This insures that the destination addresses closest to the allocation bit will be flagged first. In the example of FIG. 8, there were no matches found in bits 0, 1, or 2. Thus, when this occurs, the output of AND gates 208–216 will all be 0. When this occurs, the output of NOR gate 218 will be a logic 1, thus enabling the second half of the selection circuit. If a match would have been found in the first half of the circuit, the output of NOR gate 218 would be 0, thus disabling the second half of the circuit.

From the example given, it is shown that a match has been found in locations 13, 11, and 10 (see signal (X)). As shown in FIG. 4, the outputs of the AND gates are cascaded together, giving priority to the most significant bit and lowest priority to the least significant bit. In other words, when a higher priority bit has been set, all subsequent bits will be 0. Given the example of FIG. 8, the first highest order bit location being set is location 13. Thus, the output of the AND gate 220 and 222 will be 0, because X15 and X14 are 0. However, the output of AND gate 224 will be 1, because X13 is set, the output of OR gate 232 inverted would be 1, and the output of NOR gate 218 is 1. Having set the output of AND gate 224 to 1, the output of OR gate 234 an all subsequent OR gates in the cascaded fashion will produce an output of 1, which are coupled to an inverting input of all subsequent AND gates 226–234, thereby insuring that those outputs will be 0. Thus, even though the comparator output has is for bit locations 11 and 10, they will be held to 0 given the circuit as shown. This insures that the address of interest which has been identified is the closest one to the allocation pointer. In other words, the instruction that is closest in time to the current instruction which is having the source lookup performed.

Continuing with the example on FIG. 8, but for cycle 3, instruction M and source 13, the corresponding binary signals are shown. Also refer to FIG. 6 for cycle n+3 wherein instruction M has a destination of 4 and a source address of 13. Also refer to the rename buffer which shows that address 13 is stored at locations 7, 6, and 4. Further note that the allocation pointer and deallocation pointer have both wrapped around the rename buffer; thus, the wraparound circuit will be producing a 0 at its output such that the non-inverted output of the exclusive OR gates will be used as the comparison window. Referring again to FIG. 8 for cycle n+3, the allocation pointer and deallocation pointer and their two's complements are shown to produce the comparison window (W). The comparison output of the plurality of comparators is shown to have is in bit locations 4, 6, and 7. When the comparator output C is ANDed with the comparison window W, the resulting signal is X, which is shown to have 1s in bit locations 4, 6, and 7.

Given this data, and referring to FIG. 4, it is shown that the first plurality of OR gates 200, 202, 204, 206 will produce an output of logic 1 from bit location 11 down through bit location 0. Given this information, only data stored within bit locations 11-0 will be of interest. Given the circuit is designed to give priority to higher order bits, the bit location 7 will set its output to a logic 1 and in the cascaded fashion will provide a logic 0 to the input of the subsequent stages, thereby holding them to 0. This produces the signal Y which is provided to the address encoder.

The present invention provides a method and apparatus for performing source lookup within a central processing unit. The present invention eliminates two-thirds of the comparators required in prior art circuits by utilizing the allocation pointer and deallocation pointer to provide a comparison window. Only entries within this comparison window are of concern for the current source lookup. It also eliminates the current bit registers and associated manipulation circuitry. Given this, addresses of interest can be quickly and easily identified with much less circuitry than in prior art circuits.

What is claimed is:

1. A source look-up method comprising the steps of:
    a) determining a comparison window between an allocation pointer and a deallocation pointer, wherein the allocation pointer points to an entry in a buffer to be allocated next and wherein the deallocation pointer points to an entry in the buffer to be deallocated next;
    b) for each entry in the buffer between the allocation pointer and the deallocation pointer, comparing a stored value in the each entry with a source value to produce a comparison output;
    c) flagging each match of the comparison of the stored value in the each entry with the source value to produce flagged matches; and
    d) identifying, from the flagged matches, an entry having source information of interest based on the allocation pointer.

2. The method of claim 1, wherein step (a) further comprises the steps of:
    converting the allocation pointer into an encoded binary allocation value;
    converting the deallocation pointer into an encoded binary deallocation value; and
    ORing the encoded binary allocation value and the encoded deallocation value to produce an encoded window.

3. The method of claim 2 further comprises the steps of:
    performing a two's complement operation on the allocation pointer to produce the encoded binary allocation value; and
    performing a two's complement operation on the deallocation pointer to produce the encoded binary deallocation value.

4. The method of claim 3, wherein the ORing step further comprises:
    exclusive ORing the encoded binary allocation value and the encoded deallocation value to produce the comparison window.

5. The method of claim 4, wherein the production of the comparison window further comprises:

inverting the comparison window when the allocation pointer wraps around the buffer; and reversing the inversion of the comparison window when the deallocation pointer wraps around the buffer.

6. The method of claim 2 further comprises:

inverting the encoded window to produce an inverted encoded window; and

ANDing bits of the inverted encoded window with bits of the comparison output to flag the matches.

7. The method of claim 6, wherein the identifying, from the flagged matches, an entry having source information of interest based on the allocation pointer further comprises:

selecting the entry having source information based on proximity of bit location of the entry having source information within the comparison output to the allocation pointer.

8. The method of claim 1 further comprises:

performing steps (a) through (d) at either dispatch or at execution.

9. A source look-up circuit comprising:

a buffer allocation queue that stores register destination address, register source address, and an buffer allocation entry of instructions that have been allocated an entry in a rename buffer;

a buffer allocation memory operably coupled to the buffer allocation queue, wherein the buffer allocation memory stores allocation information pertaining to allocation of a register destination to a rename buffer location in the buffer allocation entry;

an allocation pointer circuit operably coupled to the buffer allocation queue and the buffer allocation memory, wherein the allocation pointer circuit provides an allocation pointer;

a deallocation pointer register operably coupled to the buffer allocation memory, wherein the deallocation pointer registers stores a deallocation pointer that points to an allocated next entry in the rename buffer to be deallocated;

a comparison bank circuit operably coupled to the buffer allocation memory, the buffer allocation queue, the allocation pointer circuit, and the deallocation pointer register, wherein the comparison bank circuit includes:

a plurality of comparators, each operably coupled to receive a comparison address and an entry of the buffer allocation memory, the plurality of comparators producing a binary comparison value;

determining means, operably coupled to the plurality of comparators, the allocation pointer register, and the deallocation pointer, for determining whether at least one dependent destination address is stored in an entry between the allocation pointer and the deallocation pointer and the at least one dependent destination address has the same address as the comparison address; and selection means, operably coupled to the determining means and the allocation pointer register, for selecting one of the at least one dependent destination addresses as a dependent destination address having information of interest.

10. The source look-up circuit of claim 9 further comprises:

a multiplexor operably coupled to the plurality of comparators, wherein the multiplexor receives, as input signals, the register source address and at least one current rename destination address and provides, based on a control signal, either the register source address or one of the at least one current rename source address as the comparison address.

11. The source look-up circuit of claim 9, wherein the determining means further comprises:

means for encoding the allocation pointer to produce an encoded allocation pointer;

means for encoding the deallocation pointer to produce an encoded deallocation pointer;

a plurality of OR gates for ORing bits of the encoded allocation pointer with bits of the encoded deallocation pointer to produce a binary comparison window; and a plurality of AND gates for ANDing bits of the comparison window with bits of the binary comparison value to identify entries in the buffer allocation memory that are storing the at least one dependent destination address.

12. The source look-up circuit of claim 11, wherein the determining means further comprises:

wrap-around circuit operably coupled to the allocation pointer register, the deallocation pointer register, and the plurality of OR gates, wherein the wrap-around circuit modifies the binary comparison window when the allocation pointer wraps around the buffer allocation memory and unmodifies the binary comparison window when the deallocation pointer wraps-around the buffer allocation memory.

13. The source look-up circuit of claim 9, wherein the allocation pointer circuit further comprises an allocation pointer register and a multiplexor, wherein the allocation pointer register stores an allocation pointer that points to a next entry for allocation in the rename buffer.

14. An integrated circuit comprising:

data cache; and floating point unit operably coupled to the data cache, wherein the floating point unit includes:

floating point register having addressable register locations, wherein an addressable register location is designated as a destination of an executable instruction;

pipe assembler operably coupled to the floating point register, the pipe assembler performs at least part of the executable instruction;

rename buffer operably coupled to the floating point register, wherein the rename buffer stores, at an allocated buffer location, the addressable register location;

a buffer allocation queue that stores the addressable register location, a source address, and the allocated buffer location of the executable instruction;

a buffer allocation memory operably coupled to the buffer allocation queue, wherein the buffer allocation memory stores the addressable register location in an entry having a corresponding address as the allocated buffer location;

an allocation pointer circuit operably coupled to the buffer allocation queue and the buffer allocation memory, wherein the allocation pointer circuit provides an allocation pointer;

a deallocation pointer register operably coupled to the buffer allocation memory, wherein the deallocation pointer registers stores a deallocation pointer that points to an allocated entry in the rename buffer to is to be deallocated next;

a comparison bank circuit operably coupled to the buffer allocation queue, the buffer allocation memory, the allocation pointer circuit, and the deallocation pointer register, wherein the comparison bank circuit includes:

a plurality of comparators, each operably coupled to receive a comparison address and an entry of the buffer allocation memory, the plurality of comparators producing a binary comparison value;

determining means, operably coupled to the plurality of comparators, the allocation pointer register, and the deallocation pointer, for determining whether at least one dependent destination address is stored in an entry between the allocation pointer and the deallocation pointer and the at least one dependent destination address has the same address as the comparison address; and selection means, operably coupled to the determining means and the allocation pointer register, for selecting one of the at least one dependent destination addresses as a dependent destination address having information of interest.

15. The integrated circuit of claim 14 further comprises:

a multiplexor operably coupled to the plurality of comparators, wherein the multiplexor receives, as input signals, the register source address and at least one current rename destination address and provides, based on a control signal, either the register source address or one of the at least one current rename source address as the comparison address.

16. The integrated circuit of claim 14, wherein the determining means further comprises:

means for encoding the allocation pointer to produce an encoded allocation pointer;

means for encoding the deallocation pointer to produce an encoded deallocation pointer;

a plurality of OR gates for ORing bits of the encoded allocation pointer with bits of the encoded deallocation pointer to produce a binary comparison window; and a plurality of AND gates for ANDing bits of the comparison window with bits of the binary comparison value to identify entries in the buffer allocation memory that are storing the at least one dependent destination address.

17. The integrated circuit of claim 16, wherein the determining means further comprises:

wrap-around circuit operably coupled to the allocation pointer register, the deallocation pointer register, and the plurality of OR gates, wherein the wrap-around circuit modifies the binary comparison window when the allocation pointer wraps around the buffer allocation memory and unmodifies the binary comparison window when the deallocation pointer wraps-around the buffer allocation memory.

18. The integrated circuit of claim 14, wherein the allocation pointer circuit further comprises an allocation pointer register and a multiplexor, wherein the allocation pointer register stores an allocation pointer that points to a next entry for allocation in the rename buffer.

19. An integrated circuit comprising:

data cache;

instruction cache; and fixed point unit operably coupled to the data cache and the instruction cache, wherein the fixed point unit includes:

general purpose register having addressable register locations, wherein an addressable register location is designated as a destination of an executable instruction;

arithmetic logic unit operably coupled to the fixed point register, the arithmetic logic unit performs at least part of the executable instruction;

rename buffer operably coupled to the fixed point register, wherein the rename buffer stores, at an allocated buffer location, the addressable register location;

a buffer allocation queue that stores the addressable register location, a source address, and the allocated buffer location of the executable instruction;

a buffer allocation memory operably coupled to the buffer allocation queue, wherein the buffer allocation memory stores the addressable register location in an entry having a corresponding address as the allocated buffer location;

an allocation pointer circuit operably coupled to the buffer allocation queue and the buffer allocation memory, wherein the allocation pointer circuit provides an allocation pointer;

a deallocation pointer register operably coupled to the buffer allocation memory, wherein the deallocation pointer registers stores a deallocation pointer that points to an allocated entry in the rename buffer to is to be deallocated next;

a comparison bank circuit operably coupled to the buffer allocation queue, the buffer allocation memory, the allocation pointer circuit, and the deallocation pointer register, wherein the comparison bank circuit includes:

a plurality of comparators, each operably coupled to receive a comparison address and an entry of the buffer allocation memory, the plurality of comparators producing a binary comparison value;

determining means, operably coupled to the plurality of comparators, the allocation pointer register, and the deallocation pointer, for determining whether at least one dependent destination address is stored in an entry between the allocation pointer and the deallocation pointer and the at least one dependent destination address has the same address as the comparison address; and selection means, operably coupled to the determining means and the allocation pointer register, for selecting one of the at least one dependent destination addresses as a dependent destination address having information of interest.

* * * * *